June 29, 1965     E. D. COMERER     3,191,897
MOUNTING FOR REFRIGERATING APPARATUS
Filed Feb. 4, 1963     2 Sheets-Sheet 1

INVENTOR.
Elwyn D. Comerer
BY Lloyd M. Keighley
His Attorney

June 29, 1965  E. D. COMERER  3,191,897
MOUNTING FOR REFRIGERATING APPARATUS
Filed Feb. 4, 1963  2 Sheets-Sheet 2

INVENTOR.
Elwyn D. Comerer
BY
Lloyd M. Keighley
His Attorney

United States Patent Office 3,191,897
Patented June 29, 1965

3,191,897
MOUNTING FOR REFRIGERATING APPARATUS
Elwyn D. Comerer, Vandalia, Ohio, assignor to General Motors Corporation, Detroit, Mich., a corporation of Delaware
Filed Feb. 4, 1963, Ser. No. 255,851
5 Claims. (Cl. 248—26)

This invention relates to refrigerating apparatus and particularly to a mounting for supporting a casing containing a startable and stoppable unit or element of the apparatus rotatable in the casing on a support within a machine compartment of a refrigerator cabinet.

An object of my invention is to provide an improved, simplified and low-cost mounting for supporting a metal casing containing an electric motor and a compressor driven thereby on and out of metal-to-metal contact with a metal support which mounting is a combined mount capable of absorbing vertical vibrations of the casing, snubbing rotary movements of the casing, arresting jars imparted thereto at or near their origin, and isolating noises created by operation of the motor-compressor in the casing from being transferred to the support therefor.

Another object of my invention is to provide a casing supporting means which eliminates use of special or additional hold-down bolts or clamps for the casing during shipment of a refrigerator cabinet in which the casing is mounted and wherein the supporting means affords limited movement of the casing relative to its support for relieving same of shocks imparted thereto.

A further object of my invention is to provide a casing mounting means for supporting top and bottom exterior ends of the casing from upper and lower portions respectively of a support, which means includes resilient rubber-like pads interposed between the ends of the casing and portions of the support and locked thereat against rotation with respect to both the casing and the support portions whereby a force built up in the pads during torsional rotary movements of the casing relative to its support is utilized for snubbing such movements and for thereafter returning the casing to its normal supported position.

In carrying out the preceding object it is a still further and more specific object of my invention to provide the upper and lower support portions for the motor-compressor casing from or on component structural parts of a refrigerator cabinet in which the casing is carried.

Further objects and advantages of the present invention will be apparent from the following description, reference being had to the accompanying drawings wherein a preferred embodiment of the present invention is clearly shown.

Figure 1:
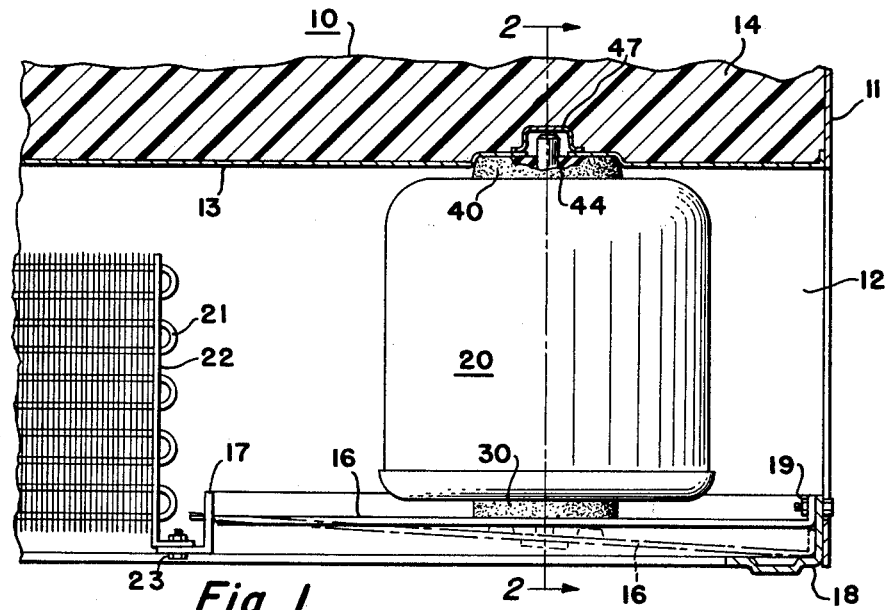
Figure 2:
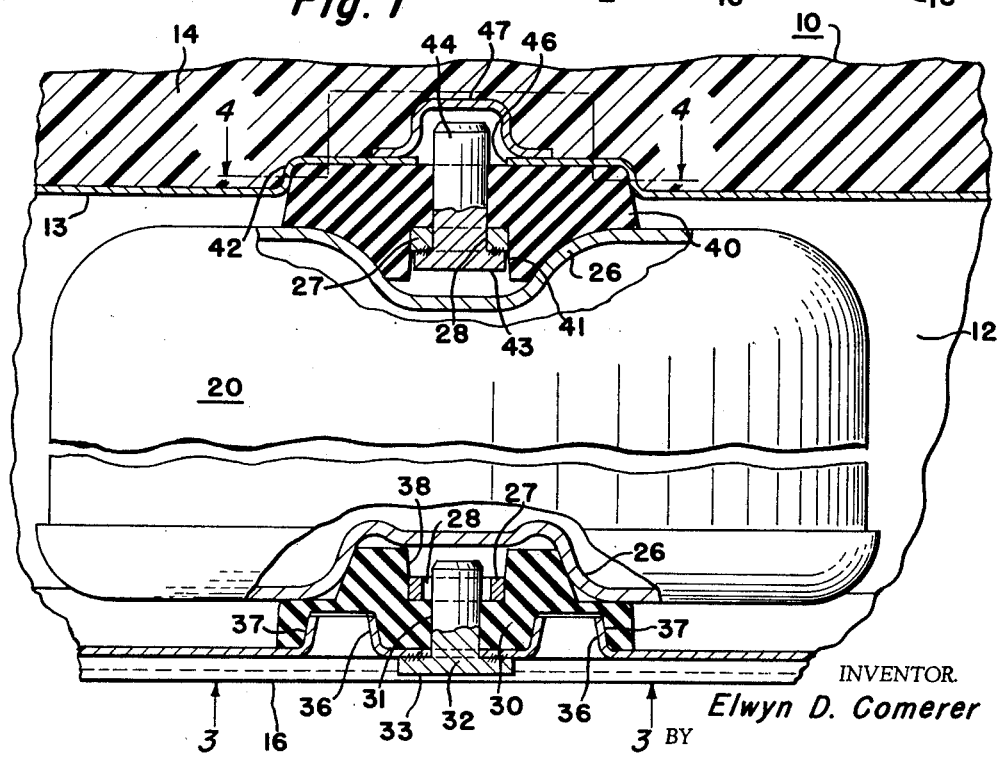
Figure 3:
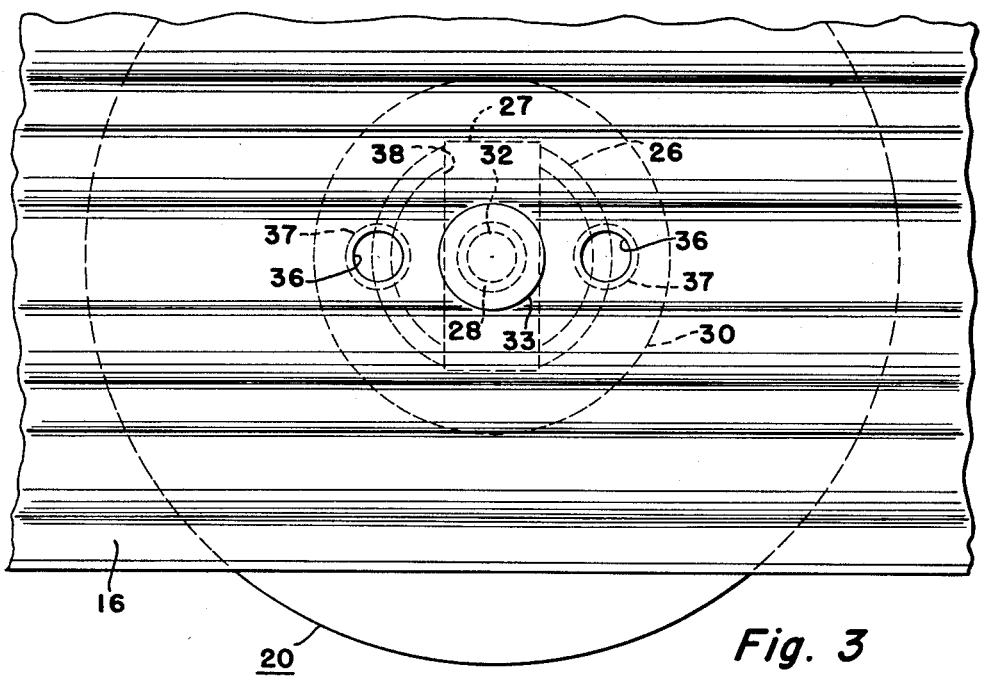
Figure 4:
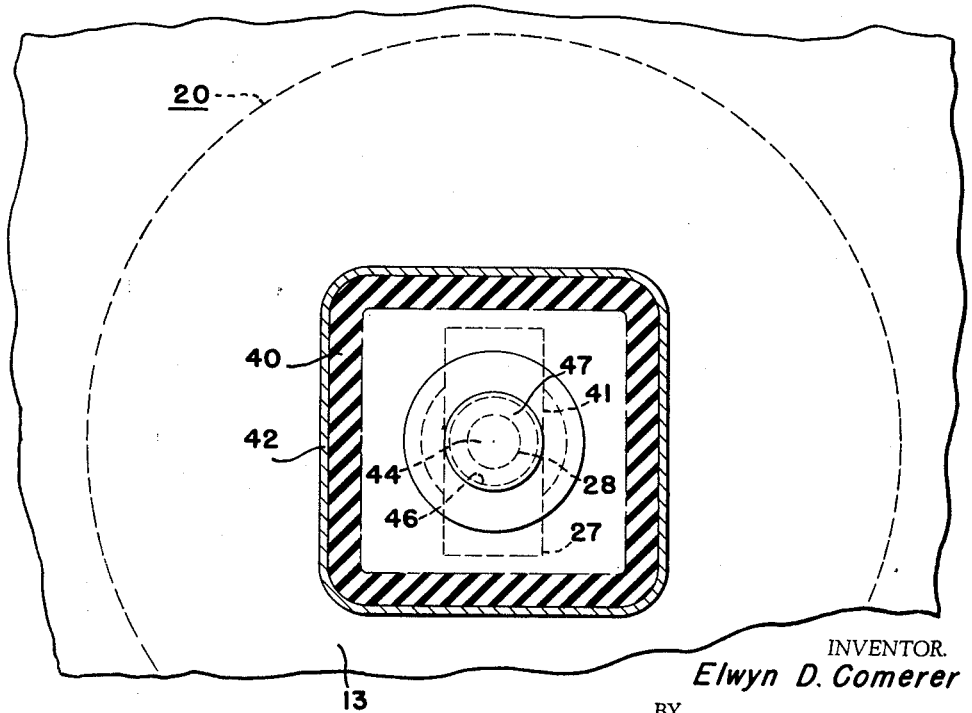

In the drawings:
FIGURE 1 is a fragmentary sectional view through a portion of a machine compartment of a refrigerator cabinet showing a motor compressor casing mounted therein according to my invention;
FIGURE 2 is an enlarged broken vertical sectional view taken on the line 2—2 of FIGURE 1 showing the motor-compressor casing supports and mountings;
FIGURE 3 is a fragmentary view taken in the direction of line 3—3 of FIGURE 2 showing locking of a rubber pad of the mounting means to the lower support and to the bottom end of the casing; and
FIGURE 4 is a fragmentary view partly in section taken on the line 4—4 of FIGURE 2 showing locking of a rubber pad of the mounting means to the upper support and to the top end of the casing.

Referring to the drawings, I show in FIGURE 1 thereof a wall or walls 11 of a refrigerator cabinet 10 in the vicinity of a machine compartment 12 therein provided with a top metal wall 13 isolated, by suitable insulating material 14, from a food storage chamber in the cabinet above the machine compartment. Top wall 13 of compartment 12 forms an upper portion of a metal support for the mounting of a casing therefrom as will be hereinafter more specifically described. A metal piece of platform 16 is hingedly secured at its one or inner end by a conventional bayonet type hinge connection to a transverse angle iron or the like part 17 of the cabinet base and the other end of platform 16 is rigidly secured on a bounding angle iron or the like part 18 of the cabinet base by bolts 19. Platform 16 is preferably corrugated for structural strength and forms a lower portion of a support for mounting a sealed metal casing 20 within the machine compartment 12. Casing 20 is vertically elongated and contains a startable and stoppable element or elements superimposed therein, in the form of an electric motor and a compressor driven thereby, of a portion of a refrigerant translating unit of a refrigerating system associated with the refrigerator 10. The casing and the motor and compressor therein may be like those illustrated in any one of the following patents: Patent No. 2,988,263, issued June 13, 1961; Patent No. 3,016,183, issued January 9, 1962; Patent No. 3,082,937, issued March 26, 1963. The refrigerant translating unit of the refrigerating system also includes a refrigerant condenser or an air-cooled condensing coil 21 carried by suitable uprights 22 mounted on the transverse part 17 of the cabinet base frame by bolts or the like 23. The refrigerating system includes a refrigerant evaporator (not shown) located in the food storage chamber (not shown) of cabinet 10 above the machine compartment 12 and is utilied to cool the interior of the chamber. The evaporator is connected by suitable pipes or conduits (not shown) with the refrigerant translating unit, such, for example, as with the casing 20 and condenser 21. Construction of a refrigerator cabinet, of a sealed motor-compressor containing casing and operation of a refrigerating system associated with a refrigerator is now conventional and well known to those skilled in the art.

Before proceeding with the description of my mounting means for a casing, containing a startable and stoppable element which is rotatable therein about a vertical axis usually located centrally of the vertical elongation of a cylindrical casing, it is desired to set forth that actual experiments have indicated the importance, from a practical standpoint, of supporting such a casing on the vertical axis of the rotatable element or elements therein. These experiments substantiate that up and down vibrations of the casing can be readily absorbed at the rotatable axis of the element therein and that abnormal transverse jars imparted to the casing are more effectively arrested at a point as close to its vertical axis as possible. In this respect, the present disclosure is to be distinguished from conventional casing mounting arrangements wherein two or more casing mounts or supports are located in an arc around a casing and spaced a considerable distance from the axis of rotation of a startable and stoppable rotatable element therein. Such arrangements due to the remoteness of the mounts from the origin of movements of a casing require these mounts to be made extra strong to withstand rotary movements of the casing and jars imparted thereto, thus complicating and increasing their manufacturing costs. The present disclosure is also to be distinguished from spring mounts for a casing because it is a feature of my invention to eliminate such springs and amplification of noises thereby which may be transmitted therethrough to the casing support.

Metal casing 20, containing the electric motor and compressor, has its top and bottom ends mounted in the refrigerator cabinet 10 from a support which, in the present disclosure, is in the form of upper and lower metal portions formed by the top wall 13 of machine compartment 12 and platform 16 respectively. Both the top and bottom ends of casing 20 are circularly depressed as at 26 (see FIGURE 2) and each depression 26 is provided with a rigid elongated means or metal piece 27 inset therein (see FIGURES 2 and 3) with its ends welded to walls of the depressions. Each elongated metal piece 27 preferably extends horizontally through the vertical axis of rotation of the rotatable element, which may be the rotor of the startable and stoppable electric motor, in casing 20 to either or opposite sides thereof and is provided with a hole 28 centered on the axis of rotation of the element. The metal pieces 27 from rigid parts of the top and bottom ends of casing 20. The depression 26 at the bottom end of casing 20 rests on a circular resilient rubber-like pad disposed between this casing bottom end and the lower portion of the support or metal platform 16 at the rotatable axis of the rotary element in casing 20. Circular pad 30 has a hole 31 provided in the center thereof which fits over and receives a rigid shank part 32 of a metal stud 33 having its head welded or otherwise suitably secured to the casing support or platform 16. Shank portion 32 of stud 33 forms a rigid part of support 16 and projects upwardly therefrom through hole 31 in pad 30 on the rotatable vertical axis of the motor rotor in casing 20 and through the hole 28 in the lower metal piece 27 out of engagement with walls thereof. In accordance with my invention pad 30 is locked against rotation with respect to both casing 20 and the platform or lower casing support 16. For that purpose I provide the lower portion of the casing support or platform 16 with one or more raised or extruded bosses 36 each spaced laterally from the rotatable axis of the operable element in casing 20 or from stud 33. The raised bosses 36 of support platform 16 fit into apertures 37 provided in the lower face of pad 30 and form means on the support engaging and locking the pad against rotation with respect thereto. The upper face of circular pad 30 is cut out to provide walls 38 of a groove therein for receiving the elongated metal piece 27 and which walls snugly engage the long sides thereof. This metal piece 27 cooperates with the groove in pad 30 and forms means to engage walls 38 of the pad for locking same to casing 20 against rotation with respect thereto.

By virtue of the arrangement just described, I have provided a combined vibration absorber, torque snubber, and jar arrester mounting for supporting the metal casing from a metal support out of metal-to-metal contact therewith. The resilient rubber-like pad 30 checks and absorbs vertical vibrations of casing 20 and rotary movements of the casing relative to its support, created by starting and/or stopping rotation of the motor rotor therein, are snubbed by pad 30 to limit such movements. Thus sudden shocks imparted to the mounting means disclosed in the direction of starting and/or stopping rotation of the motor rotor in casing 20 are effectively checked substantially at their point of origin rather than at a point remote or spaced therefrom. That portion of pad 30 intermediate the locking means, bosses 36 and groove walls 38, stores up force therein during snubbing of rotary movements of casing 20 and this force is utilized for thereafter returning the casing to its normal supported position. The rigid part, stud 33 of platform support 16, is normally out of engagement with the rigid part, metal piece 27, of casing 20 and upon imparting jars to the casing, in a direction transverse of the vertical axis of rotation of the motor rotor therein, shank part 32 of stud 33 directly engages the wall of hole 28 in metal piece 27 to arrest the jars. It is to be noted that the arresting of jars imparted to casing 20 takes place substantially centrally of the mounting means or close to the origin thereof and this prevents disassembly of the means under abnormal jarring conditions.

The top end of casing 20 (see FIGURES 2 and 4) has a mounting for supporting same from the upper portion of the support, top wall 13 of the machine compartment 12, which is similar to the lower mounting of the casing. For example, another substantially squared or rectangularly shaped resilient rubber-like pad 40 on top of the casing is provided with a groove in its lower face for receiving the elongated metal piece 27 on the top end of casing 20 and walls 41 of which groove snugly embrace long sides of the metal piece to lock pad 40 to the casing against rotation with respect thereto. The squared part of pad 40 fits into squared recess or depression 42 provided in the upper portion of support or wall 13 for locking this pad to the support against rotation with respect thereto. A stud 43 has its head welded or otherwise suitably secured to the opening 28 in upper metal piece 27 to form a rigid part of casing 20. Stud 43 is provided with a shank portion 44 projecting vertically upwardly on the rotatable axis of the motor rotor in casing 20. Shank portion 44 of stud 43 extends through a hole in the center of squared pad 40 and therebeyond through an aperture 46 in support wall 13 into an inverted cup-like cap 47 welded to wall 13 over the aperture therein. The stud 43 or rigid part at the top end of casing 20 is normally out of engagement with walls of cap 47 on wall 13 and these rigid parts are adapted to directly engage one another upon impartation of jars to casing 20 in a direction transverse to the vertical axis thereof or to the rotatable axis of the motor rotor contained in the casing. The securing arrangement for the top end of casing 20 to the support or metal wall 13 provides a combined vibration absorber, torque snubber and jar arrester mounting for supporting the metal casing therefrom and out of metal-to-metal contact therewith. Resilient rubber-like pad 40 cooperates with pad 30 in absorbing vertical vibrations of casing 20 and torsional rotary movements thereof relative to its support caused by starting and/or stopping the motor rotor and compressor within the casing. While the mount for the top end of casing 20 as described is more or less auxiliary to the mounting of its bottom end, it is highly desired for cooperation therewith to maintain the vertical elongated casing in assembled relation on its lower mount and particularly in arresting jars imparted to the casing during shipment or transportation of the refrigerator casing in which it is housed.

Motor-compressor containing casing 20 may be assembled into machine compartment 12 in refrigerator cabinet 10 in any suitable or desirable fashion and for the purpose of this disclosure one method of assembly will be described. The outer end of corrugated platform support 16 normally rests on bounding portion 18 of the cabinet base, as illustrated by the dot-dash lines in FIGURE 1 of the drawings. Casing 20, with pad 30 on metal piece 27 at the bottom thereof and with pad 40 on metal piece at the top thereof, is moved angularly through the open side of compartment 12 and hole 31 and apertures 37 in the pad 30 are brought into registration with shank part 32 of stud 33 and bosses 36 respectively of the hinged platform support portion 16. The pad 30 assembled to casing 20 is then inserted over stud shank 32 and bosses 36. Casing 20 is thereby supported by platform 16 in an inclined position with respect to the vertical and outer end of platform 16 is now elevated, about the hinged end thereof, relative to the bounding portion 18 of the cabinet base to guide pad 40 into the squared recess 42 of upper support or wall 13 and shank part 44 of upper stud 43 into the rigid inverted cup-like cap 47 thereon. After so elevating the outer end of platform 16 to locate the top mounting means within the socket-like part 42 of the upper support portion of compartment wall 13, as shown by the full lines in FIGURES 1 and 2 of the drawings, this outer or shiftable end of platform support 16 is rigidly affixed to the bounding cabinet base 18 by the bolts 19. In this manner casing 20 is supported centrally of its top and bottom ends from upper and lower portions of the support in machine compartment 13 by my combined mounting means.

From the foregoing, it should be apparent that I have provided resilient means for mounting a casing containing a rotatable element from supports in a compartment of a refrigerator cabinet at the axis of rotation of the element in the casing, which means is comprised of a minimum number of substantially inexpensive parts. The mounting of the motor-compressor casing is efficient, practical, and the casing is at all times free to move in a plurality of directions in restricted fashion relative to its support with its movements effectively cushioned, snubbed and arrested. My improved arrangement absorbs high frequency vibrations and deadens or prevents noises caused by operation of the motor and compressor in the casing from being amplified by its mounting support in the cabinet and transmitted to a room in which the refrigerator is installed. By locating the mounting means for the casing on the vertical axis of the rotary element contained therein, I check movements of the casing thereat to minimize the distance thereof thus relieving intense strain on supporting portions of the casing in a refrigerator cabinet. My mounting arrangement eliminates the use of hold-down shipping clamps or bolts which are ordinarily discarded and wasted after installation of a refrigerator cabinet and it is of such character as to withstand severe tumble tests for insuring proper functioning of the mounts after shipment of the cabinet with the casing therein from a factory.

While the embodiment of the present invention as herein disclosed constitutes a preferred form, it is to be understood that other forms might be adopted.

What is claimed is as follows:

1. In combination,
   (a) a metal casing member, opposed supports adjacent opposite surfaces of said casing member,
   (b) one of said supports comprising a supporting structure and an elongated member pivotally connected adjacent one end to said supporting structure,
   (c) fastening means adjacent the opposite end connecting said elongated member and said supporting structure,
   (d) and resilient rubber-like upper and lower pads between said supports and the opposite surfaces of said casing member.

2. In combination,
   (a) a metal casing member,
   (b) a combined vibration absorber and torque sunbber and jar arrester for said casing member comprising opposed supports adjacent opposite surfaces of said casing member,
   (c) resilient rubber-like pads disposed between said casing member and said opposed supports,
   (d) said supports being provided with pad-engaging means for engaging and locking said pads against rotation relative to said supports,
   (e) said casing member being provided with means spaced from said pad-engaging means for engaging and locking said pads against rotation relative to said casing members.

3. In combination,
   (a) a metal casing member having opposite surfaces provided with recesses,
   (b) a combined vibration absorber and torque snubber and jar arrester for said casing member comprising opposed supports adjacent said recesses,
   (c) resilient rubber-like pads disposed in said recesses between said casing member and said opposed supports,
   (d) said supports being provided with pad-engaging means for engaging said pads and locking said pads against rotation.

4. In combination,
   (a) a metal casing member having opposite surfaces provided with recesses,
   (b) a combined vibration absorber and torque snubber and jar arrester for said casing member comprising opposed supports adjacent said recesses,
   (c) resilient rubber-like pads disposed in said recesses between said casing member and said opposed supports,
   (d) said supports being provided with pad-engaging means for engaging said pads and locking said pads against rotation,
   (e) said metal casing member being provided with transverse bridge members located in said recesses for engaging said pads and locking said pads against rotation relative to said casing member.

5. A combination according to claim 2 having means extending within said pads cooperating with said supports and said means spaced from said pad-engaging means for limiting the movement of said casing member laterally relative to said supports.

References Cited by the Examiner

UNITED STATES PATENTS 2,233,102  2/41  Kucher _____ 248—26
2,935,279  5/60  La Porte _____ 248—22

CLAUDE A. LE ROY, *Primary Examiner*.